PREPARATION PROCESS

| | STEP |
|---|---|
| ADMIXTURE A: 60-99.9 MOL % MONOVINYL-TYPE MONOMER, 0.1-40 MOL% POLYVINYL-TYPE MONOMER, 0.1-2 % W/W OF METAL FLAKES OF 16-400 MESH, AND POLYMERIZATION INITIATING CATALYST | (a) |
| ADMIXTURE B: WATER, BUFFER AND PROTECTIVE COLLOID PRODUCING AGENT, AT pH OF 5-11 | (b) |
| CONTINUOUS MIXING OF ADMIXTURES A AND B WITH HEATING AT 40-90°C PAST GEL POINT TO FORM SOLID PRODUCTS | (c) |
| SEPARATION OF SOLID SMOOTH SPHEROIDAL ORGANIC POLYMER PRODUCTS, ARTICLES HAVING METALLIC FLAKES ANNULARLY AND CIRCUMFERENTIALLY DISPOSED THEREIN | (d) |
| WASHING AND DRYING ARTICLES | (e) |

FIG. 2

3,428,514
SPHERICAL REFLECTANT ORGANIC POLYMER
ARTICLE AND PROCESS
Albert H. Greer, Haddonfield, and Robert W. Hardy,
Summit, N.J., assignors to Ritter Pfaudler Corporation,
Rochester, N.Y., a corporation of New York
Filed May 18, 1966, Ser. No. 551,105
U.S. Cl. 161—5        8 Claims
Int. Cl. B01j *13/02;* C02b *5/00*

ABSTRACT OF THE DISCLOSURE

Disclosed is a smooth surfaced transparent spheroidal reflective cross linked polymer bead having a utility in reflective paint and in silk screening printing inks, including 0.1 to 2% by weight of reflectant metal flakes ranging in size from 16 to 400 mesh distributed near the surface of the bead, the inner core of the cross linked polymer bead being substantially void of reflectant metal flakes, and a process for the preparation thereof comprising a suspension polymerization carried out on an admixture of two moieties, the first moiety comprising 60 to 100 mol percent of a monovinyl-type monomer, 0.1 to 40 mol percent of a polyvinyl cross linking agent, a suitable catalyst and 0.1 to 2% by weight of metal flakes and the second moiety comprising water, protective colloids and a buffer to maintain the pH of 5:11.

---

This invention relates to a composite spheroidal reflective organic polymer article and to a process for its preparation. Particularly, this invention relates to a composite spheroidal reflective organic polymer article which has a smoothly surfaced, substantially spheroidal body of substantially transparent, crosslinked organic polymer which has lodged within it a plurality of reflectant metal flakes that are substantially annularly and circumferentially disposed; and further relates to an organic suspension polymerization method for the preparation of this article.

In the reflective material arts, use has been made of spheroidal glass articles in combination with metallized reflectant surfaces without said articles to provide, in combination, reflectant systems for such diverse usage as highway signs and marking paints, decorative reflectant silk screening designs on fabrics, etc., taking advantage of the eye appealing and attention-getting properties imparted by the reflective surfaces of the glass beads, and of the metal surfaces. Fabrication of and products employing said beads, however, has presented various difficulties due to the necessary joining of two elements, the spheroidal beads and an external metallic reflectant surface. Among these difficulties are included maintaining a necessary critical distance between the beads and the metal reflectant surfaces so as to provide an enhancement of reflectivity thereby. It has heretofore been impossible to incorporate the reflectant metal surfaces within the reflectant beads, and therefore the two elements necessarily were combined employing a third element, say a clear polymeric matrix, such as a varnish to join them to form a composite reflective article.

The present invention seeks to provide a composite reflective spheroidal article in which reflective metal surfaces are incorporated within a spheroidal reflective article as an integral part thereof.

It is another object of this invention to provide a simple method for preparing composite spheroidal reflective articles having reflectant metal flakes incorporated therein circumferentially disposed so as to provide a maximum enhancement of reflectivity.

Other desirable objects of this invention are inherent in or will become apparent from the following descriptions, explanations and drawings.

FIG. 2 is a flow chart of the preparation process of the invention for making articles of the invention.

Figure 1:
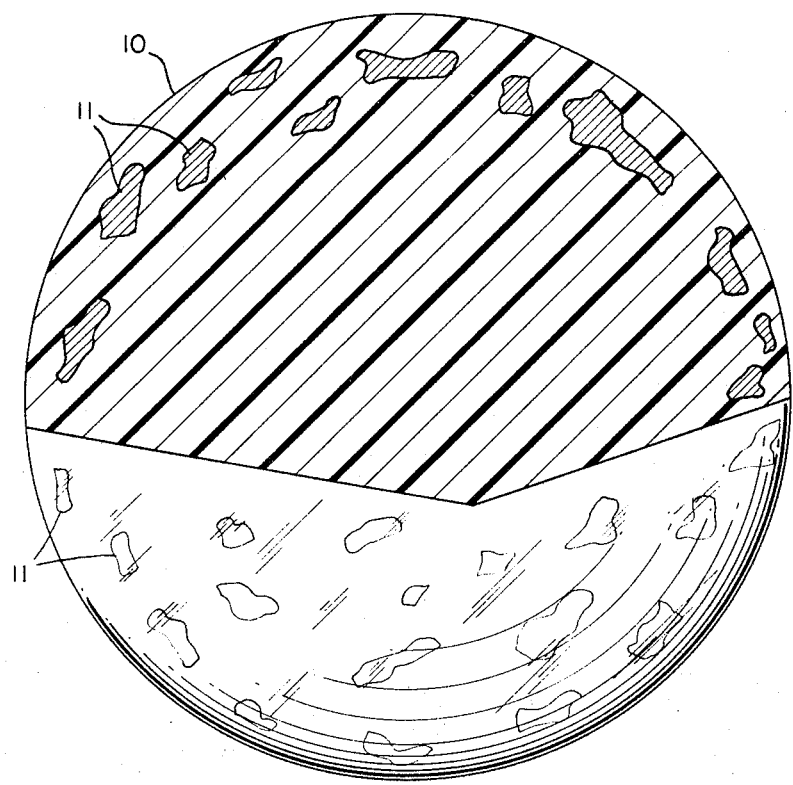
FIG. 1 is a partial cross-sectional view of a composite spheroidal reflective organic polymer article of this invention having a smoothly surfaced, substantially spheroidal body of substantially transparent crosslinked organic polymer and a plurality of reflectant metal flakes substantially annularly and circumferentially disposed within.

We have found that the objects of this invention may be substantially attained by providing articles which are smoothly surfaced and substantially transparent so as to provide reflectant surfaces, prepared from crosslinked organic polymers. The reflectivity of the surfaces of such spheroidal bodies, we have found, is substantially enhanced by the inclusion within these bodies of reflectant metal flakes, wherein said flakes are annularly and circumferentially disposed. The crosslinked nature of the polymer body, we have further found, substantially resists dissolution by aqueous and organic liquids, so that such articles may be employed in liquid media such as varnishes or aqueous dispersion to be used as reflective paints or in silk screening printing inks. The circumferential disposition of the reflectant metal flakes within the organic polymer body in combination with the substantially transparent nature of the polymer provides a highly desirable synergistic enhancement of reflectivity from the spheroidal surfaces of the polymer body. The substantially annular disposition of the reflectant metal flakes within the spheroidal polymer body provides the body with a core that is substantially free of metal flakes which would otherwise undesirably reduce the multiple internal reflections which occur from the internal spheroidal surfaces of the article, and makes more efficient the reflective enhancements of the metal flakes by cutting down on random reflections.

We have found that the unusual articles of this invention may be prepared by copolymerizing by suspension techniques at least one monovinyl-type monomer, which is to say an organic monomer containing a single

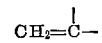

group per molecule with at least one polyvinyl-type monomer, which is to say a monomer containing at least two

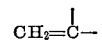

groups per molecule in mol ratios of about 60 to 99.9 mol percent of monovinyl-type monomer to about 0.1 to 40 mol percent of polyvinyl-type monomer, in the presence of about 0.1 to 2 percent by weight of a plurality of metal reflectant flakes. In this suspension polymerization process the metal flakes, desirably having an average size of from 16 to 400 mesh, U.S. Standard sieve, are admixed with the monovinyl-type and polyvinyl-type monomers and an effective quantity of a vinyl polymerization initiating catalyst to form a single admixture. Another admixture is prepared of water, a protective colloid producing agent useful in maintaining the suspension droplet size desired, and an effective amount of a buffering material sufficient to maintain this admixture at a pH within the range of from about 5 to 11. The pH level is critical for upon subsequent mixing and polymerization of the two admixtures a pH of less than 5 would deleteriously affect the metal flakes by chemical reaction therewith, and a pH of greater than 11 would deleteriously affect maintaining the metal flakes within the body of polymerizing organic monomers, for some as yet unknown reason. The admixtures are mixed together continuously with heating, preferably at temperatures of about 40 to 90° C. past the gel point of the copolymers to form solid products. The solid products so formed have smooth skins and are spheroidal bodies of substantiallly transparent and crosslinked organic polymer. The organic bodies contain a plurality of reflectant metal flakes which upon microscopic examination are shown to be annularly and circumferentially disposed within, such as may be seen in FIG. 1. The solid product articles are then, according to the invention, separated from the liquid portions of the polymerization medium say by filtration, etc. The separated spheroidal articles are then washed, say with an organic solvent such as acetone or ethyl alcohol and then water to free the spheroidal surfaces of undesirable impurities which may deleteriously affect their reflectant properties, and then are dried, say under vacuum or by desiccation.

The monovinyl-type unsaturated monomers which are suitable for this invention include the following: styrene, vinyl toluene, vinyl xylene, vinyl ethylbenzene, vinyl naphthalene, acetanaphthylene, vinyl diphenyls, vinyl diphenyloxides, and similar unsaturated compounds; methyl acrylate, ethyl acrylate, propyl acrylate, butyl acrylate, benzyl acrylate, and corresponding esters of methacrylic acid; vinyl acetate, vinyl propionate, vinyl butyrate, vinyl methacrylate and similar unsaturated compounds; methyl vinyl ether, ethyl vinyl ether, propyl vinyl ether and similar unsaturated compounds; methyl vinyl ketone, ethyl vinyl ketone, propyl vinyl ketone and similar unsaturated monomers. The monovinyl moiety may also include nuclear and aliphatic substitution such as by halogens, nitro, cyano and similar substituents. Another class of suitable monovinyl-type monomers include nitrogen heterocyclic compounds, such as the vinylpyridines: 2-vinylpyridine, 4-vinylpyridine, 3-vinylpyridine, 2-methyl-5-vinylpyridine and similar unsaturated compounds; the vinylquinolines such as 2-methyl-5-vinylquinoline, 4-methyl-4-vinylquinoline and the vinylpyrrolidenes. Another class of monovinyl-type monomers is the dialkyl unsaturated esters such as dialkylmaleate, dialkylfumarate, dialkylitaconate and other similar compounds. Another class of suitable monovinyl-type monomers is the sulfur containing heterocyclic monomers such as the vinylfuranes, vinylthiophenes and similar unsaturated monomers. Among the monovinyl-type monomers, styrene is preferred.

Among the polyvinyl-type crosslinking monomers which may be used are monomers containing two or more vinyl groups such as: divinylbenzene, divinyltoluene, divinylnaphthalene, divinylethylbenzene, divinylxylene, divinylpyridine, diallylphthalate, ethylene glycol diacrylate, ethylene glycol dimethacrylate, diallyl maleate, diallyl fumarate, diallyl succinate, diallyl carbonate, diallyl malonate, diallyl oxylate, and similar divinyl compounds: N'-methylenedimethacrylamide, N,N'-methylenediacrylamide and other similar compounds. Other monomers which contain more than two vinyl groups and which are suitable as crosslinking agents include trivinylbenzene, trivinylnaphthalene, trivinylanthracene. The divinyl and trivinyl compounds may also be nuclear halogenated or alkylated, and the aliphatic crosslinking agents may have halogen substituents. Among the polyvinyl-type monomers, the divinylbenzenes are preferred.

The copolymer formed by the reaction between the monovinyl-type monomer and the crosslinking polyvinyl-type monomer should contain on a molar basis a predominant amount of the monovinyl compound. It is preferred that the monovinyl-type monomer constitute from 60–99.9 mol percent of the copolymer. Optimum transparency results when said monovinyl-type monomer comprises 92 to 99 mol percent of the copolymerized spherical polymer body of the article.

With respect to reflectant metal flakes which may be used in the process of this invention, any elemental or alloyed metal which is substantially non-reactive with the fore-going monomers, with water, with the polymerization initiator, with the buffering material, and with the protective colloid producing agent may be employed. Among these, one may include flakes of brass, tin, gold, silver, aluminum, rhodium iridium, platinum, stainless steel, zinc, chromium, and their various alloys. The average size of metal flakes to be used is experimentally determinable depending upon the desired reflectant properties of the end article of this invention. However, the range of useful sizes for such flakes falls within between about 16 to 400 mesh, U.S. Standard sieve. The weight quantity of metal flakes to be employed in the present process falls within a critical range of 0.1 to 2 percent by weight of the total of monomers employed. Below about 0.1 percent by weight an insufficient amount of metal flakes is present to provide the desired synergistic increase in reflectant properties of the end reflectant polymeric spheroids. When greater than about 2 percent by weight of metal flakes is employed in the present process the annulus of metal flakes distributed circumferentially within the bead becomes so densely inhabited by such flakes so as not to permit light to pass between adjacent flakes within the annulus and thus cuts down substantially upon the internal reflections within the article, which it is believed are responsible for at least a portion of the synergistic enhancement of reflectant properties. Further, use of quantities in excess of 2 percent by weight of metal flakes brings metal flakes to the surface of the polymer spheroid further decreasing the desired enhancement of reflective properties due to the cooperation of a substantially transparent smooth reflectant spheroidal surface and internally disposed reflective metal flakes. Yet further, great excess of metal flakes beyond 2 percent by weight provides loss of a goodly portion of the flakes during the polymerization process due to the flakes coming out of the polymerizing monomer spheroids and into the dispersed aqueous-buffered phase.

With respect to the useful protective colloid producing agents presently suitable, they may include those substances commonly used in the suspension polymerization arts such as gelatin, gum arabic, and other natural gums, casein, carboxymethyl cellulose, 2-hydroxyethyl cellulose and similar cellulosic protective colloid producing agents and the sundry aryl amides commonly found useful; and such inorganic protective colloid producing agents and suspension aids as tricalcium phosphate, and other phosphates, magnesium silicate, and other silicious suspension aids. We have found that, although such agents are well known in type and have been used in diverse quantities for diverse purposes, for the purposes of the present invention an effective amount of protective colloid producing agent must be present in the aqueous disperse phase in concentrations of from about 0.5 to 3.0 weight percent, based upon the weight of water employed. Below 0.5 weight percent insufficient agent is present to prevent agglomeration of the forming reflective articles during the polymerization process. Although some small excess of colloid producing agent above 3.0 weight percent may, under special circumstances be tolerated, we have found that, in general substantial excesses greater than this amount will adversely affect the reflectant properties and physical structure of the end spheroidal reflective article produced.

Suitable vinyl polymerization initiator catalysts include ozone, oxygen, organic peroxides such as cetyl peroxide, tertiary butyl hydroperoxide, benzoyl peroxide, hydrogen peroxide, so called "per-salts" such as water soluble persulfates and the azoketonitriles such as azo-bis-isobutyronitrile and azo-bis-cyclopropylpropionitrile. These may be employed in suitable amounts ranging from 0.1–2% by weight based on the weight of the monomeric materials to be polymerized.

With respect to the amounts of water which desirably may be used in the suspension polymerization process, we have found that the range of ratios of weight of the total of monomers to that of water may be from about 1:1 to 1:10, and preferably is about 1:2.5.

With respect to the order of addition of the monomers-containing admixture and the aqueous buffered admixture, it is preferred that the monomers-containing admixture be added to the aqueous buffer-containing admixture for better particle size control of the reflective spheroidal article produced.

The polymerization initiating catalyst must, according to the invention, be added to the monomers-containing admixture prior to suspension polymerization, rather than to the aqueous buffer-containing admixture, in order that polymerization be carried successfully beyond the gel point and to the desired solid spherical reflectant article produced. Further, such incorporation of the catalyst into the monomers-containing admixture also is necessary to prevent a throwing-out of the metallic flakes from the polymerizing monomer spheroids during the process. Therefore, it is also necsesary, due to the presence of the polymerization intiating catalyst, that the monomers-containing admixture, prior to its addition to the aqueous buffer-containing admixture, be kept at a temperature below the decomposition temperature of the initiator, that is to say at a temperature below which the initiator will form free-radicals and induce premature polymerization; suitable temperatures for maintaining the catalyst-containing and monomer-containing admixture are between about 20 to about 50° C. for most catalysts.

With respect to the use of commercial preparations comprising reflectant metal flakes and an inert organic liquid carrier therefor, some preparations contain quinoid-type compounds, such as 2-hydroquinone, which may act as inhibitors for the desired polymerization in the present process. In those instances, such preparations may be made useful by extracting such inhibitors prior to the incorporation of the metal flake paste into the monomers-containing admixture. It is important to the practice of the present invention that the metal flakes be wetted by the organic monomers, and therefore one may readily see the necessity of adding the metal flakes to the monomers-containing admixture rather than the aqueous buffer-containing admixture.

With respect to the average size of the spheroidal reflectant polymeric articles of this invention, they may be prescribed by the well known techniques involved in the suspension polymerization arts; usually, the most useful articles of the present invention are of average size from about 2 to 200 mesh. It is readily apparent that the metal flakes to be used to produce articles of size 2 to about 200 mesh must be, in size, smaller than the size of the articles in order that a plurality of such flakes be distributed therein. Proper choice of flake size to article size, following the teaching of the present invention is well within the ordinary skill of a practitioner of the polymerization arts, to achieve particular desired end composite spherioidal reflective articles of the invention.

Turning to the figures, in FIG. 1 the present article is depicted having a smoothly surfaced substantially spheroidal body of substantially transparent, crosslinked organic polymer 10, and a plurality of reflectant metal flakes 11 substantially annularly and circumferentially disposed within said organic polymer body. In FIG. 2, the flow chart of the preparation process for the instant article of this invention depicts in steps (a) to (e) the preparation and constituents of the monomers-containing admixture (Admixture A) and the aqueous buffer-containing admixture (Admixture B), the suspension copolymerization of the monomers, step (c), the separation of the product articles produced, step (d) and the washing and drying of the articles of the invention.

The following examples illustrate the practice of the invention, the preparation of articles of the invention and their nature, but does not seek to limit its scope.

EXAMPLE I

A stainless steel pot equipped with a stirrer, a high speed agitator, thermometer and a heating jacket was charged with 3 liters of demineralized water and sufficient and effective quantities of a borate caustic buffer material to maintain a pH of about 10. One gram of carboxymethyl cellulose and 18 grams of casein, both protective colloid producing agents, were added thereto, and the resulting solution was heated to 70° C. with stirring. In a separate container, a suspension was prepared containing 1,081 grams of styrene, 109 grams of 55% by weight divinylbenzene and 45% by weight ethyl vinyl benzene, 14 grams of azo-bis-isobutyronitrile, vinyl polymerization initiator, and 6 grams of an aluminum paste containing approximately 60 to 90% by weight of metallic aluminum flakes of about 200 mesh and the balance of an inert organic liquid carrier. The monomer mixture was added, with stirring, to the water solution, and the stirring speed was adjusted to produce a polymer spheroidal article of about −80 mesh. Prior to the gel point of the copolymerizing monomers, which occurred after about one hour at 70° C., a slurry of 9 grams of casein in a small amount of water was added to help prevent agglomeration of the spheroids. The settling point of the polymer spheroids was reached after about three hours at 70° C. The articles were obtained in a yield of about 90–95% of theoretical based on monomers charged. The article obtained were washed with water and dried under vacuum just below about 60° C.

EXAMPLE II

In a two-liter, three-necked flask equipped with a stirrer, thermometer, and a high speed agitator was charged one liter of demineralized water containing a sufficient and effective amount of sodium borate buffer to produce a pH of about 9. Six grams of gum arabic and 0.4 gram of gelatin, both protective colloid producing agents, and 9.4 grams of sodium chloride were added to the aqueous buffer solution. In a separate container, a suspension containing 364 grams of styrene, 36 grams of 56.2% by weight of divinyl benzene and about 44% by weight of ethyl vinyl benzene, 3.2 grams of azo-bis-isobutyronitrile, the vinyl polymerization initiator catalyst, and 2 grams of an aluminum paste similar to that of Example I was prepared and added all at once with stirring to the preheated buffer solution at 70° C. under high speed agitation. Suspension polymerization was pursued past the gel point. The settling point of the spheroidal polymeric articles was reached after four hours with a yield of 93% based on weight of monomers charged. The polymer spheroids were washed with water and vacuum dried below 60° C. to produce a highly reflectant bead-like articles of predominantly −80 mesh in average size. Microscopic examination of the articles revealed substantially transparent organic polymer smooth surfaced spheroids containing a plurality of reflectant metal flakes annularly and circumferentially disposed therein.

EXAMPLE III

A stainless steel pot equipped with a six-bladed stirrer, thermometer and heating jacket was filled with three liters of a boric acid-caustic buffer solution to provide a pH of 9–10. Thirty grams of gelatin, 30 grams of gum arabic, both protective colloid producing agents, and 28 grams of NaCl were added; and the resulting solution was heated to 70°. A suspension containing 1,081 grams of styrene, 109 grams of a 55% by weight divinyl benzene and 45% by weight ethyl vinyl benzene mixture to provide 5 wt. percent crosslinking, and 10.0 grams (0.8%) of azo-bis-isobutyronitrile catalyst and 6 grams (0.5%) of an aluminum paste similar to that of Example I were added at once to the monomer mix. The monomer mixture was then added to the water mixture under high speed agitation. The polymerization was maintained at about 70° C., past the gel point, and was completed within 3–4 hours. There was obtained a yield of 96% by weight of spheroidal polymer articles. The articles' surfaces were clean; no aluminum flake was in the polymerization filtrate. The articles were dried under vacuum at temperatures below 60° C. The screen size analysis of the spheroidal articles showed:

|  | Percent |
|---|---|
| +40 | Trace |
| +60 | 8 |
| +80 | 21 |
| +120 | 42 |
| +170 | 16 |
| −170 | 13 |

Microscopic examination disclosed circumferential and annular distribution of reflectant metal flakes with the spheroids.

EXAMPLE IV

In a two-liter, three-necked flask equipped with a stirrer, thermometer and a high speed agitator there was placed 1 liter of demineralized water containing a sufficient and effective amount of sodium borate buffer to produce a pH of 9. Ten grams of gum arabic, 10 grams of gelatine and 9.5 grams of sodium chloride were added to the buffer solution. In a separate container, a suspension containing 360 grams of styrene, 40 grams of 50% by weight divinylbenzene, the remainder being essentially ethylvinylbenzene, 3.2 grams of azo-bis-isobutyronitrile and 2 grams of a paste of flakes of a brilliant pale gold colored copper alloy and an inert organic liquid carrier, having a metal content of about 60–90% was made up and added all at once with stirring to the preheated buffer solution at 70° C. under high speed agitation. The suspension copolymerization was pursued at about 70° C. past the gel point; the settling point was reached after 4 hours with a polymer article yield of 93%. The spheroidal polymer articles obtained were washed with water and vacuum dried at a temperature below 60° C. to produce a highly reflectant bead of predominantly −80 mesh and which contained sufficient amount of encapsulated bronze flakes to yield a brilliant gold reflecting surface. Microscopic examination showed the flakes to be disposed as shown in FIG. 1.

In each of the foregoing examples articles were produced which showed unusually great reflectant properties, the articles of Examples I, II and III being of a brilliant silvery appearance, and that of Example IV of a brilliant gold apearance. The foregoing articles, to the eye, appear to have a greatly enhanced reflectivity over beads of otherwise identical polymer of otherwise identical configuration and size, which however had no metal flakes distributed within.

We claim:
1. A solid composite spheroidal reflective article comprising:
   (a) a smoothly surfaced, substantially transparent and spheroidal body of a cross linked organic polymer; and
   (b) a plurality of reflectant metal flakes disposed near the surface of and within said spheroidal body comprising about 0.1 to 2% by weight of said article, the inner core of said article being substantially void of reflectant metal flakes.
2. An article according to claim 1 wherein said crosslinked organic polymer is a copolymer of from about 60 to 99.9 mol percent of a monovinyl-type monomer and from about 0.1 to 40 mol percent of a polyvinyl-type monomer.
3. An article according to claim 1 wherein said metal flakes are of average size from about 16 to 400 mesh.
4. An article according to claim 2 wherein said monovinyl-type monomer is styrene and said polyvinyl-type monomer is divinyl benzene.
5. An article according to claim 3 wherein said metal flakes are of aluminum.
6. An article according to claim 3 wherein said metal flakes are of copper.
7. A process for the preparation of the solid composite spheroidal reflective organic polymer article of claim 2, which comprises
   (a) preparing an admixture comprising from about 60 to 99.9 mol percent of a vinyl monomer having a single

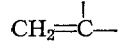

group per molecule, from about 0.1 to 40 mol percent of a vinyl monomer having a plurality of

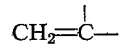

groups per molecule, an effective amount of a vinyl-polymerization initiating catalyst and reflectant metal flakes of about 16 to 400 mesh in average size and in effective quantities of from about 0.1 to 2 percent by weight of said monomers;
   (b) preparing an admixture of water, an effective quantity of a protective colloid producing agent, and an effective quantity of a buffering material so as to maintain the pH of said admixture within the critical range of from about 5 to 11;
   (c) mixing the admixtures of steps (a) and (b) with one another continuously and heating from about 40° C. to 90° C. to suspension copolymerize said monomers past the gel point to form solid products;
   (d) separating the solid products formed in step (c), which solid products are in the form of spheroidal, smoothly surfaced, reflectant, substantially transparent crosslinked organic polymer articles, having a plurality of reflectant metal flakes annularly and circumferentially disposed therein; and
   (e) washing and drying said separated articles.
8. A process according to claim 7 wherein said vinyl monomer having a single

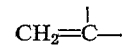

group is styrene and said vinyl monomer having a plurality of

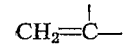

groups is divinyl benzene.

References Cited

UNITED STATES PATENTS

| 2,555,715 | 6/1951 | Tatum | 350—105 |
| 2,769,788 | 11/1956 | Craven et al. | 260—41 |
| 3,252,376 | 5/1966 | De Vries | 350—105 |

MORRIS LIEBMAN, *Primary Examiner.*

J. H. DERRINGTON, *Assistant Examiner.*

U.S. Cl. X.R.

161—162; 260—41; 94—1.5